UNITED STATES PATENT OFFICE.

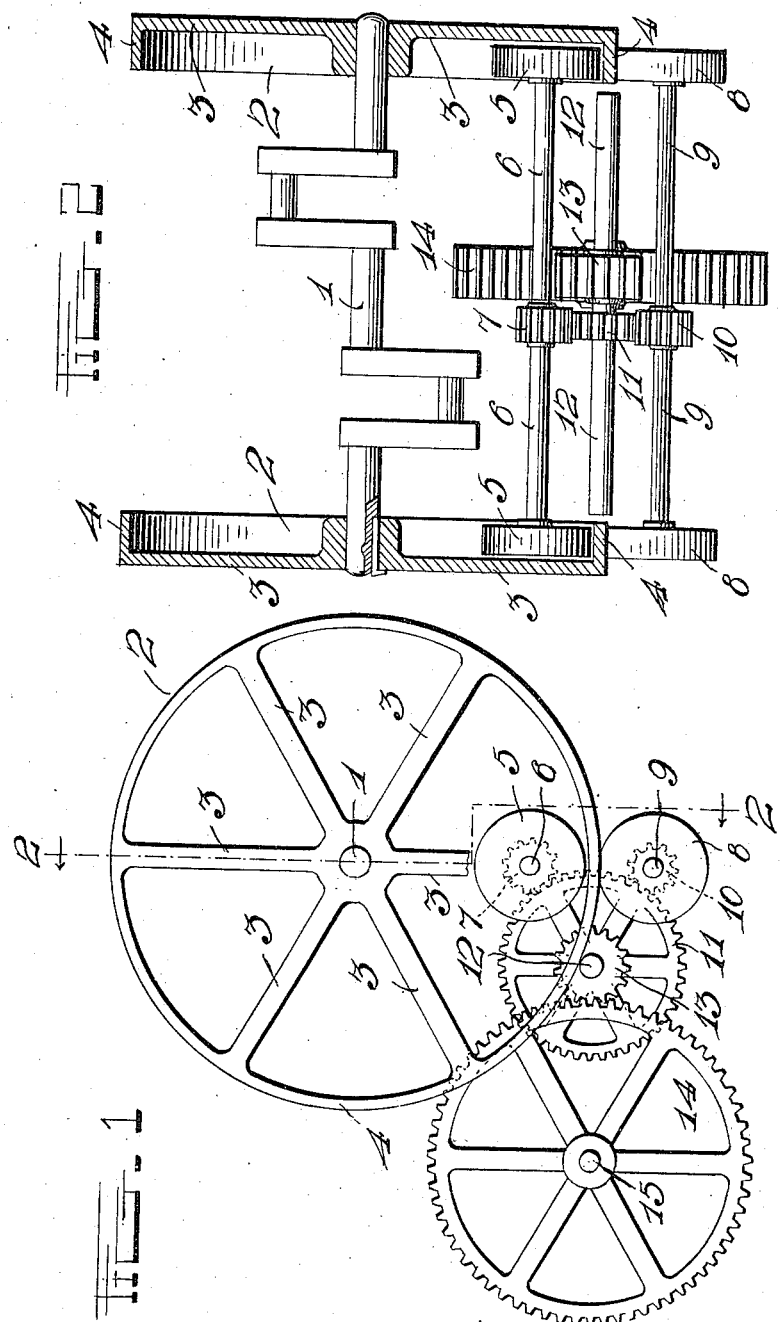

RICHARD NORRIS, OF MARION, OHIO, ASSIGNOR OF ONE-HALF TO HAYES THOMPSON, OF MARION, OHIO.

FRICTION DRIVING MECHANISM.

976,281.   Specification of Letters Patent.   Patented Nov. 22, 1910.

Application filed May 5, 1910. Serial No. 559,450.

*To all whom it may concern:*

Be it known that I, RICHARD NORRIS, a citizen of the United States, residing at Marion, in the county of Marion and State of Ohio, have invented certain new and useful Improvements in a Friction Driving Mechanism for Vehicles; and I do declare the following to be a full, clear, and exact description of the invention, such as will enable others skilled in the art to which it appertains to make and use the same.

This invention relates to improvements in friction driving mechanism for vehicles.

One object of the invention is to improve the construction and arrangement of friction driving devices of this character whereby the vehicle to which they are applied may be driven at the same speed in any direction.

Another object is to provide a device of this character which will be simple, strong and durable in construction, efficient in operation and well adapted to the purpose for which it is designed.

With the foregoing and other objects in view the invention consists of certain novel features of construction, combination and arrangement of parts as will be more fully described and particularly pointed out in the appended claims.

In the accompanying drawings: Figure 1 is an end elevation of a friction driving mechanism constructed in accordance with my invention; Fig. 2 is a vertical section of the same on a line 2—2 of Fig. 1.

Referring more particularly to the drawings 1 denotes the crank shaft of an engine on the outer ends of which are fixedly mounted fly wheels 2. The spokes 3 of the fly wheels are connected to the outer edges of the rims 4 of the wheels thus providing a frictional bearing surface on the inner sides of the rim as shown. Adapted to be engaged with the inner bearing surface of the rims 4 are friction pulleys 5 fixed on the opposite ends of a suitably mounted shaft 6 on which is also fixed a spur pinion 7. Adapted to be engaged with the outer surface of the rims 4 of the fly wheels are friction pulleys 8 said pulleys being fixed on the outer ends of a suitably mounted shaft 9 on which is also fixed a spur pinion 10. The shafts 6 and 9 of the friction pulleys 5 and 8 are adapted to be shifted by means of a suitable shifting mechanism (not shown) to bring the gears 5 and 8 into and out of engagement with the inner and outer surfaces of the rims of the fly wheels 2.

The pinions 7 and 10 of the shafts 6 and 9 are adapted to engage a spur gear 11 fixed on a suitably mounted shaft 12. On the shaft 12 is also fixed a spur pinion 13 which is in operative engagement with a large spur gear 14 fixed on a suitably mounted shaft 15 and is connected in any suitable manner with the traction wheels of the vehicle.

By arranging the gears and friction pulleys as herein shown and described the vehicle will be driven in one direction by the engagement of the pulleys 5 with the inner friction surfaces of the rims 4 of the fly wheels and may be driven at the same speed in the opposite direction by the engagement of the friction pulleys 8 with the outer surfaces of the rims 4 of the fly wheels. It will thus be seen that a traction engine or other vehicle having my improved gearing applied thereto may be driven in one direction and the parts quickly reversed for driving the engine or vehicle at the same speed in the opposite direction.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention as defined in the appended claims.

Having thus described my invention, what I claim is:

1. In a traction driving mechanism of the character described the combination with the crank shaft of an engine of a shaft to be driven, fly wheels secured to said crank shaft and having formed on the rims thereof inner and outer friction bearing surfaces, friction pulleys adapted to be operatively engaged with said inner and outer bearing surfaces and a train of gears adapted to connect said pulleys with the shaft to be driven.

2. In a friction driving mechanism for vehicles the combination with the crank shaft of an engine and a shaft to be driven, of fly wheels fixedly mounted on said crank shaft said wheels having rims provided with inner and outer friction surfaces and shafts, friction pulleys for engagement with said surfaces secured to said last mentioned shafts, drive pinions fixed on the shafts of said pulleys and gearing to operatively connect said pinions with the shaft to be driven.

In testimony whereof I have hereunto set my hand in presence of two subscribing witnesses.

RICHARD NORRIS.

Witnesses:
W. H. WINTRINGHAM,
H. S. WILLIAMS.